(12) United States Patent
Hildebrandt

(10) Patent No.: US 7,523,613 B2
(45) Date of Patent: Apr. 28, 2009

(54) PROCESS AND DEVICE FOR UTILIZING WASTE HEAT

(76) Inventor: Ralf Richard Hildebrandt, Luneplate 1, 28259, Bremen (DE)

( * ) Notice: Subject to any disclaimer, the term of this patent is extended or adjusted under 35 U.S.C. 154(b) by 398 days.

(21) Appl. No.: 11/206,877

(22) Filed: Aug. 18, 2005

(65) Prior Publication Data

US 2006/0037320 A1   Feb. 23, 2006

(30) Foreign Application Priority Data

Aug. 20, 2004   (DE) .................. 10 2004 040 730

(51) Int. Cl.
*F01K 23/10* (2006.01)
(52) U.S. Cl. .................. 60/618; 60/651; 60/671
(58) Field of Classification Search ............... 60/614, 60/616, 618, 651, 671
See application file for complete search history.

(56) References Cited

U.S. PATENT DOCUMENTS 4,170,116 A   10/1979   Williams

| 4,342,200 | A | * | 8/1982 | Lowi, Jr. .................. 62/191 |
| 4,841,916 | A | | 6/1989 | Sumitomo et al. |
| 5,161,377 | A | | 11/1992 | Müller et al. |
| 6,962,056 | B2 | * | 11/2005 | Brasz et al. .................. 60/772 |
| 7,254,949 | B2 | * | 8/2007 | Brasz et al. .................. 60/618 |
| 2003/0005696 | A1 | | 1/2003 | Wilson |

FOREIGN PATENT DOCUMENTS

| EP | 0 931 978 | 7/1999 |
| WO | WO 2004/044386 A2 | 5/2004 |
| WO | WO 2005/031123 | 4/2005 |

* cited by examiner

*Primary Examiner*—Hoang M Nguyen
(74) *Attorney, Agent, or Firm*—McGlew and Tuttle, P.C.

(57) ABSTRACT

A process, device and system are provided for utilizing waste heat from a waste heat source, especially from an internal combustion engine, by a coolant being heated and by this heat being used to drive a turbine. The device utilizes waste heat with a waste heat source (10, 20) cooled by a coolant, with a turbine (11) and with an evaporating device (16) for the coolant. To increase the efficiency of such a process and such a device and system, and to reduce the design effort and the maintenance effort, the coolant is evaporated after it leaves the waste heat source (10, 20) and the evaporating means is provided after the waste heat source (10, 20) when viewed in the direction of flow of the coolant.

20 Claims, 2 Drawing Sheets

PROCESS AND DEVICE FOR UTILIZING WASTE HEAT

CROSS REFERENCE TO RELATED APPLICATIONS

This application claims the benefit of priority under 35 U.S.C. § 119 of German Application DE 10 2004 040 730.4 filed Aug. 20, 2004, the entire contents of which are incorporated herein by reference.

FIELD OF THE INVENTION

The present invention pertains to a process for utilizing waste heat from a waste heat source, especially from an internal combustion engine, by heating a coolant and using this heat to drive a turbine. Furthermore, the present invention pertains to a device for carrying out such a process.

BACKGROUND OF THE INVENTION

Such a device and such a process are known from US 2003/0005696 A1. The coolant, particularly water, is heated from 71° C. to 79° C. in an internal combustion engine and then evaporated by means of nozzles. The coolant is then introduced into an evaporating chamber, in which a vacuum of 0.5 bar prevails. The steam is drawn off from this evaporating chamber by means of a pump and afterheated in a exhaust gas heat exchanger. The steam thus afterheated is first introduced into a first turbine, which drives the pump, and it is sent to the working turbine proper only thereafter.

Consequently, the steam generated at first is still subjected to afterheating and secondary compression. Wet steam is obviously formed in such a case in the evaporating chamber (4), because the steam is present within this evaporating chamber together with the cooling water flowing back from the condenser. Therefore, there is a risk during the secondary compression of the wet steam by the pump that the steam will condense again. Moreover, a steam must be delivered, which is associated with higher losses, because, unlike a liquid, steam is a compressible medium. Not only because of this, a large part of the energy of expansion released during the evaporation of the coolant is destroyed by the aftertreatment of the steam.

It known from WO 2004/044386 A2 to feed the coolant, for example, from an internal combustion engine to heat exchanger/evaporator, in which another liquid is heated and evaporated in the process. This evaporated liquid is sent to a turbine and the latter is driven as a result. The turbine drives, in turn, a generator. As is usual in cycles, the steam is subsequently condensed and sent again to the heat exchanger/evaporator by means of a pump.

The drawback of this procedure is that heat losses occur due to the additional heat exchanger. In addition, the liquid or the steam can be heated in the evaporator to a temperature below the temperature of the coolant only. The efficiency is reduced hereby as well. Furthermore, a design effort and maintenance effort are needed for a second system.

SUMMARY OF THE INVENTION

Based on this, the basic object of the present invention is to further improve a process and a device of the type described in the introduction such that the efficiency is increased and the design effort and the maintenance effort decrease.

To accomplish this object, the process according to the present invention is characterized in that the coolant is sent directly to the turbine after the evaporation.

According to the present invention, the steam generated is fed to the turbine for generating energy directly, i.e., without an additional treatment, in the process according to the present invention and in the device according to the present invention. The coolant is heated at first by the waste heat source and then evaporated by expanding it through a nozzle to a pressure below the vapor pressure and/or by heating it by another (waste) heat source to a temperature above the boiling point. The coolant is heated by the waste heat of, for example, an internal combustion engine to a temperature that does not yet exceed the boiling point at the preset system pressure in the means to be cooled, for example, the internal combustion engine. The coolant consequently remains liquid and is not evaporated. The coolant is evaporated by a suitable evaporating means only at the inlet into the turbine and the steam is used to drive the turbine. The present invention is based on the discovery that, on the one hand, the heat exchanger present in the state of the art is eliminated as a source of loss. However, this measure is not sufficient in itself, because the coolant must not evaporate within, for example, an internal combustion engine, because the heat transfer from, for example, the internal combustion engine to the coolant would otherwise collapse and the internal combustion engine cannot be effectively cooled any longer and it will overheat. Consequently, the coolant leaves, for example, the internal combustion engine in the liquid state and is evaporated only after leaving the internal combustion engine. It is logical with such a system to deliver the coolant as a liquid up to a point located directly in front of the turbine (at or just upstream of the turbine intake) and to evaporate it only at the inlet, because liquid as an incompressible medium can be delivered well.

On the one hand, a nozzle, through which the coolant is expanded to a sufficient pressure to generate enough superheated steam for the turbine, is suitable for use as an evaporator for the coolant. On the other hand, another heat source, which may be another waste heat source with a higher temperature, is suitable for use as an evaporator. An exhaust gas heat exchanger for cooling the exhaust gas or an intercooler shall be considered an example.

Other features of the present invention pertain to embodiments of the process and the device and will be explained in greater detail below on the basis of exemplary embodiments shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
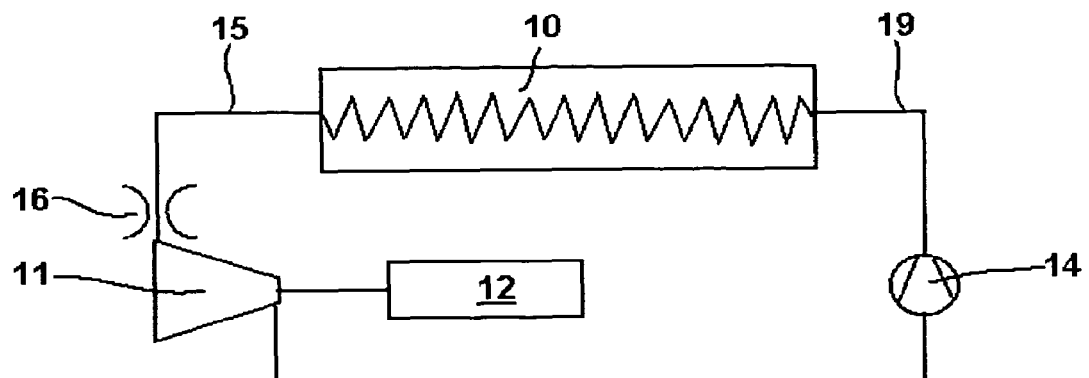
FIG. 1 is a schematic view of a first exemplary embodiment of a device with the features of the present invention.

Referring to the drawings in particular, FIGS. 1 through 4 show a process according to the Rankine cycle.

The device shown schematically in FIG. 1 has a waste heat source, namely, an internal combustion engine 10, a turbine 11, which drives a generator 12, a condenser 13, and a pump 14. A coolant for cooling the internal combustion engine 10 is heated in the internal combustion engine. The coolant is under an increased pressure of, e.g., 4 bar and is heated to a temperature of about 80° C. The values for the pressure and the temperature are less important here. What is more important is to ensure that the coolant is not heated to above the boiling point in the internal combustion engine 10 at a preset system pressure, so that the coolant will not evaporate. For example, dodecafluoro-2-methylpentane-3 ($CF_3CF_2C(O)CF(CF_3)_2$) is suitable for use as a coolant at the pressure of 4 bar and the temperature of 80° C. This coolant has, moreover, the advantage that it is fireproof.

The coolant thus heated by the waste heat of the internal combustion engine 10 is fed in the liquid, i.e., non-gaseous state by means of the coolant line 15. Immediately before the inlet of the coolant into the turbine 11, a nozzle 16, through which the coolant is expanded under vapor pressure, is provided at the transition of the coolant line 15 to the turbine 11. The coolant evaporates as a result and is introduced into the working area of the turbine 11 in the gaseous form. The coolant is expanded now in the nozzle 16 to the extent that a steam that is sufficiently superheated for the operation of the turbine 11 is formed.

After leaving the turbine 11, the steam, which may now already be in the form of wet steam, is sent via a coolant line 17 to the condenser 13 and condensed there. From there the coolant reaches a pump 14 via a line 18, and it is again compressed there to the system pressure necessary for entry into the internal combustion engine 10. The coolant flows from the pump 14 to the internal combustion engine 10 via a line 19.

Figure 2:
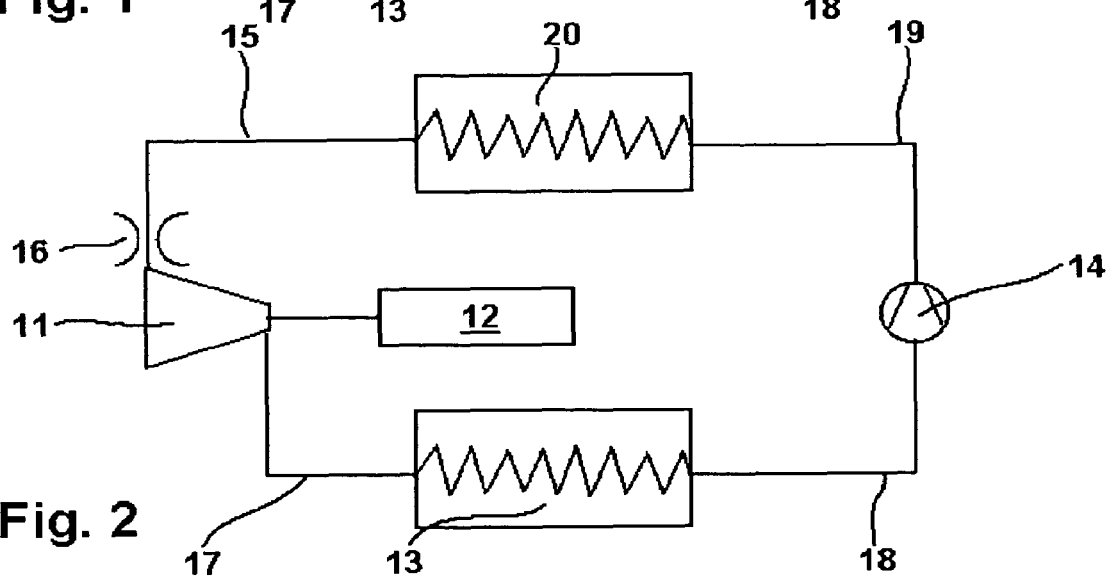
FIG. 2 is a schematic view of a second exemplary embodiment of a device with the features of the present invention.

The device according to FIG. 2 has a design analogous to that of the device according to FIG. 1. It differs in the waste heat source only. A waste heat cooler of an internal combustion engine is used as the waste heat source in the exemplary embodiment according to FIG. 2. Corresponding to the exhaust gas temperature of about 250° C., which is higher than the coolant temperature, a higher coolant temperature can be reached here, so that, regardless of the boiling point of the coolant, a higher steam pressure is present, and it is therefore also possible to operate with a higher system pressure in the exhaust gas heat exchanger 20.

Figure 3:
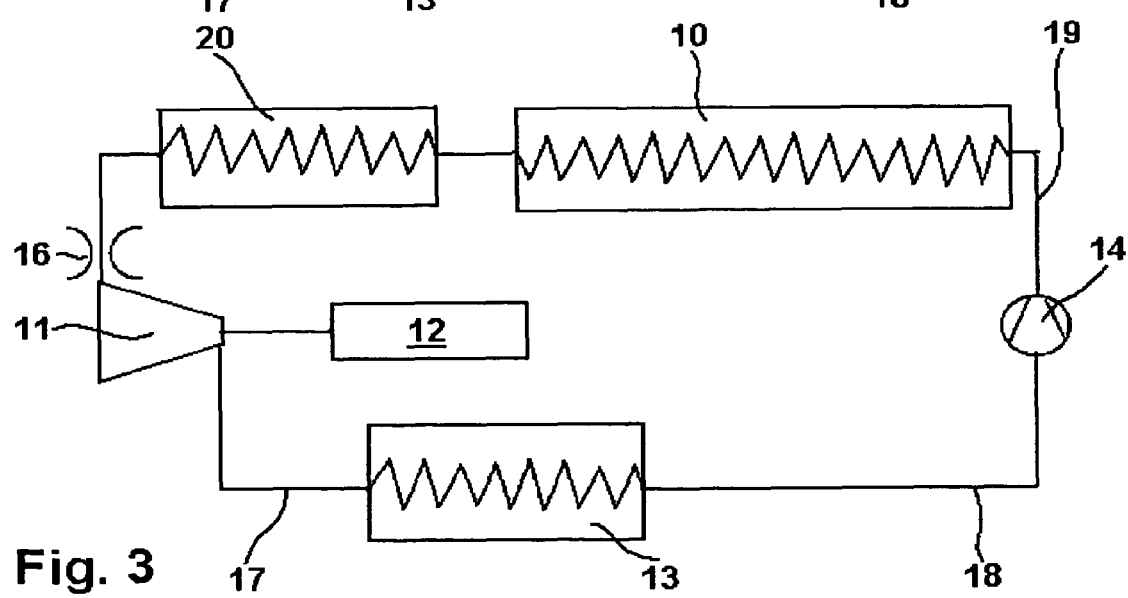
FIG. 3 is a schematic view of a third exemplary embodiment of a device with the features of the present invention.

FIG. 3 shows a variant in which two heat sources, namely, an internal combustion engine 10 and a exhaust gas heat exchanger 20, are provided. The coolant is first heated by the internal combustion engine 10 to 80° C. and it is then heated to about 250° by the exhaust gas heat exchanger 20. The coolant leaves the exhaust gas heat exchanger 20 in the liquid, i.e., non-gaseous form in this case as well and is expanded into superheated steam in the nozzle 16 only.

Figure 4:
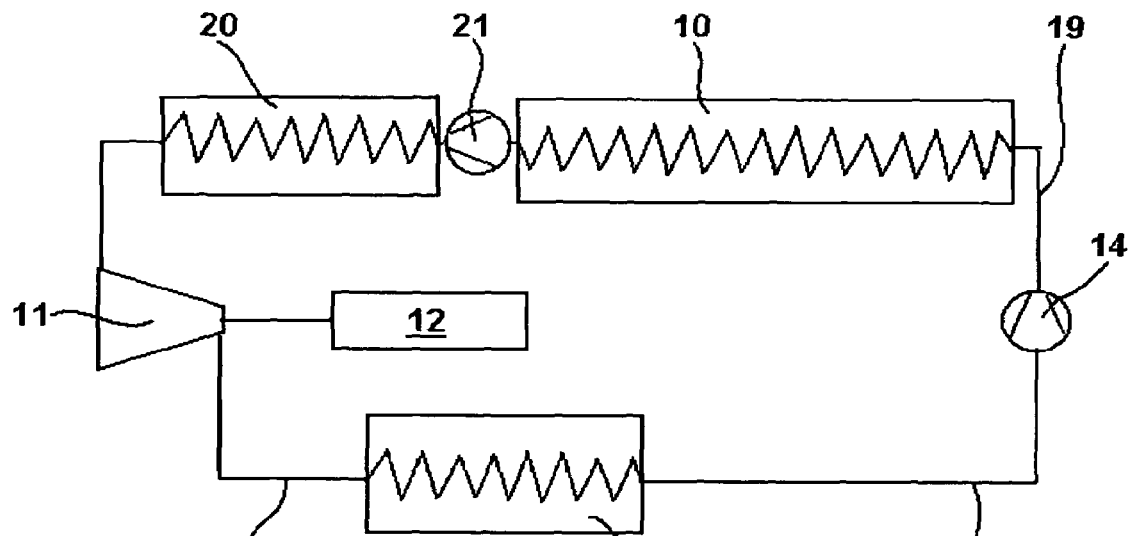
FIG. 4 is a schematic view of a fourth exemplary embodiment of a device with the features of the present invention.

Unlike in the internal combustion engine 10, it is not absolutely necessary to maintain a certain operating temperature in the exhaust gas heat exchanger 20, so that it is definitely possible without a safety risk or without a risk for the safety of the operation to evaporate the coolant already in the exhaust gas heat exchanger 20. Such a case is shown in FIG. 4. The nozzle 16 is eliminated in this exemplary embodiment and the superheated steam is generated in the exhaust gas heat exchanger 20. Consequently, the exhaust gas heat exchanger is the evaporating means in this case. Furthermore, an additional pump 21 is provided between the internal combustion engine 10 and the exhaust gas heat exchanger 20 to increase the system pressure for the exhaust gas heat exchanger 20. Calculations for this variant according to FIG. 4 have shown that the efficiency of large diesel units can be increased by up to 5%, i.e., from about 40% to 45%.

If the pump 21 is not used, the gain in efficiency is not so high despite the additional effort for the pump 21 in the exemplary embodiment according to FIG. 4. Nevertheless, this variant is, of course, also possible.

Figure 5:
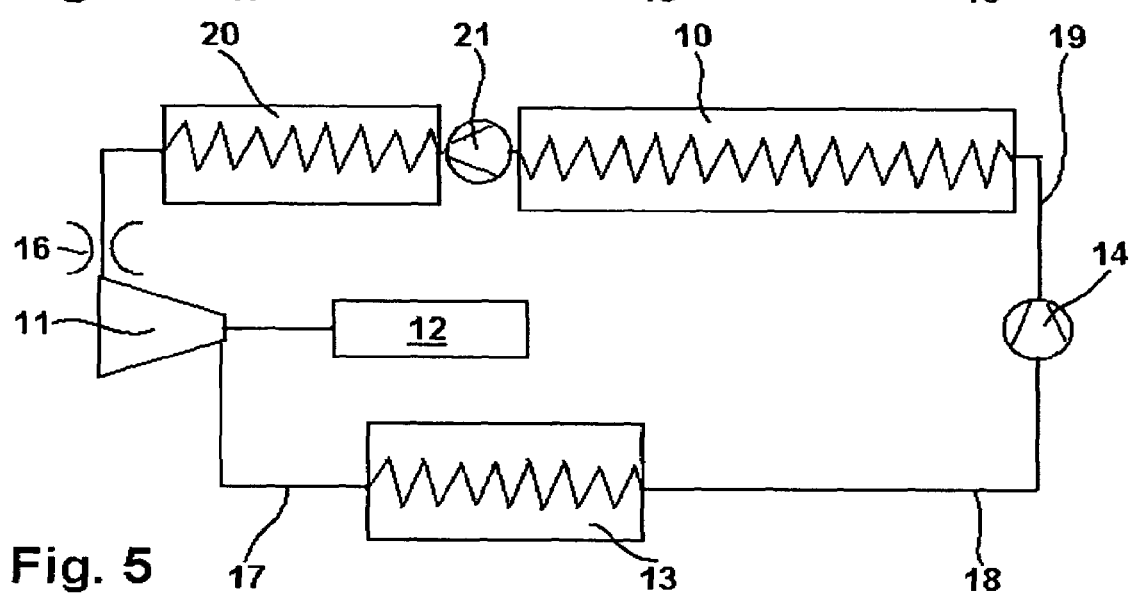
FIG. 5 is a schematic view of another exemplary embodiment of a device with the features of the present invention.

Based on the exemplary embodiment according to FIG. 4, it is also possible to expand the coolant into superheated steam at first in an additional nozzle 16 analogously to the exemplary embodiment according to FIG. 3 or to generate wet steam or superheated steam in the exhaust gas heat exchanger 20, and to further expand this wet steam or superheated steam into superheated steam or even more highly superheated steam in the nozzle 16 (FIG. 5).

In addition or as an alternative, an intercooler may also be used for the exhaust gas heat exchanger 20 shown in FIGS. 2 through 4.

While specific embodiments of the invention have been shown and described in detail to illustrate the application of the principles of the invention, it will be understood that the invention may be embodied otherwise without departing from such principles.

APPENDIX

10 Internal combustion engine
11 Turbine
12 Generator
13 Condenser
14 Pump
15 Coolant line
16 Nozzle
17 Coolant line
18 Coolant line
19 Coolant line
20 Exhaust gas heat exchanger
21 Pump

What is claimed is:

1. An internal combustion engine system, comprising:
a liquid cooled internal combustion engine with a liquid coolant inlet and a liquid coolant outlet;
a coolant forming the only liquid coolant medium for cooling said liquid cooled internal combustion engine;
a fluid conduit forming a closed loop means, said closed loop means including a first liquid conduit portion, a second liquid conduit portion and a vapor conduit portion, said first liquid conduit portion extending at least from said liquid coolant inlet to said liquid coolant outlet, said first liquid conduit portion including a first pressure delimiting means upstream of said liquid coolant inlet and a second pressure delimiting means downstream of said liquid coolant outlet said first pressure delimiting means and said second pressure delimiting means cooperating for maintaining an engine coolant pressure in said first liquid conduit portion;
a pump comprising said first pressure delimiting means, said pump being connected to said fluid conduit between said first liquid conduit portion and said second liquid conduit portion such that said coolant in said liquid state is transported within said first liquid conduit portion and said second liquid conduit portion, said first liquid conduit portion connecting said pump to said liquid coolant inlet, said pump receiving said coolant in said liquid state at a first pressure prevailing in said second liquid conduit portion, said pump transporting said coolant in said liquid state within said first liquid conduit portion at said engine coolant pressure for cooling the internal combustion engine via said coolant and for heating the coolant by said internal combustion engine at said engine coolant pressure to a first temperature below a boiling point of the coolant at said engine coolant pressure such that said coolant remains in a liquid state without any part thereof vaporizing in said first liquid conduit portion;

an evaporating means connected to said internal combustion engine via said first liquid conduit portion for receiving the coolant in said liquid state and for evaporating the coolant in said liquid state by heating the coolant to a second temperature above the boiling point of the coolant and/or by expanding the coolant to a vapor pressure such that said coolant changes from said liquid state to an evaporated state, whereby evaporated coolant is produced via said evaporating means; and a turbine connected to said evaporating means via said vapor conduit portion, said evaporating means being provided directly upstream of said turbine with respect to a direction of flow of the coolant to feed evaporated coolant directly from said evaporating means to said turbine.

2. A system in accordance with claim 1, wherein said evaporating means is provided directly at an inlet into said turbine.

3. A device in accordance with claim 1, further comprising a pump provided between the internal combustion engine and an additional heat source and forming said second pressure delimiting means.

4. A system in accordance with claim 2, wherein said internal combustion engine is a diesel engine.

5. A system in accordance with claim 1, further comprising a condenser connected to said closed loop means, said condenser being located downstream of said turbine.

6. A system in accordance with claim 1, wherein said second pressure delimiting means comprises said evaporating means in the form of an expander.

7. A system in accordance with claim 1, wherein said second pressure delimiting means comprises a pump for pumping coolant to said evaporating means.

8. A system in accordance with claim 1, wherein said engine coolant pressure is about 4 bar and said coolant is heated to a temperature of at least 80° C. and up to 250° C. in said internal combustion engine.

9. A process for utilizing waste heat from, an internal combustion engine, the process comprising the steps of:
providing a liquid cooled internal combustion engine with a liquid coolant inlet and a liquid coolant outlet;
providing a fluid conduit forming a closed loop means, the closed loop means including a first liquid conduit portion, a second liquid conduit portion and a vapor conduit portion, the first liquid conduit portion extending at least from the liquid coolant inlet to the liquid coolant outlet, the first liquid conduit portion including a first pressure delimiting means upstream of the liquid coolant inlet and a second pressure delimiting means downstream of the liquid coolant outlet;
providing a coolant as the only liquid coolant medium for cooling said liquid cooled internal combustion engine;

maintaining the coolant at an engine preset coolant pressure in the first liquid conduit portion with the first pressure delimiting means and the second pressure delimiting means;
heating the coolant with the internal combustion engine between the liquid coolant inlet and the liquid coolant outlet to a first temperature below the boiling point of the coolant at the preset coolant pressure such that an entirety of said coolant remains in a liquid state without intermixed vapor as it flows through the first liquid conduit portion;
after the coolant fully passes through the the internal combustion engine between the liquid coolant inlet and the liquid coolant outlet in said liquid form, evaporating the coolant by heating the coolant in said liquid form to a second temperature above the boiling point and/or expanding the coolant to below the vapor pressure to produce evaporated coolant flowing in said vapor conduit portion; and
sending the evaporated coolant directly to a turbine after evaporation of said coolant.

10. A process in accordance with claim 9, wherein said internal combustion engine is a diesel engine.

11. A process in accordance with claim 9, wherein said coolant is sent to said turbine as a liquid after heating in said internal combustion engine and it is evaporated only at an inlet to the turbine.

12. A process in accordance with claim 9, wherein superheated steam is generated during the evaporation of the coolant.

13. A process in accordance with claim 9, wherein the coolant is heated in said internal combustion engine under a pressure of 4 bar to a temperature of at least 80° C. and up to 250° C.

14. A process in accordance with claim 13, wherein the coolant is heated in said internal combustion engine to a temperature of about 80° C. and in another said heat source to a higher temperature.

15. A process in accordance with claim 13, wherein the coolant is heated in said internal combustion engine to a temperature of about 80° C. and in another said heat source to about 250° C., and evaporated.

16. A process in accordance with claim 14, wherein after leaving said internal combustion engine, the coolant is compressed to an increased pressure and is evaporated with this higher pressure in said additional heat source.

17. An internal combustion engine system comprising:
a liquid cooled internal combustion engine with a liquid coolant inlet and a liquid coolant outlet;
a coolant forming the only coolant medium for cooling said liquid cooled internal combustion engine;
a coolant line system forming a closed loop maintaining said coolant in said coolant line system, said coolant line system having a first liquid conduit portion including an entire liquid coolant passage of said internal combustion engine from said liquid coolant inlet to said liquid coolant outlet, a second liquid conduit portion connected to said first liquid conduit portion, a vapor conduit portion connected to said first liquid conduit portion and a vapor to liquid condensation portion connected between said vapor conduit portion and said second liquid conduit portion;
a pump forming a first pressure delimiting means upstream of said liquid coolant inlet, said pump being connected between said first liquid conduit portion and said second liquid conduit portion such that said coolant in said liquid state is transported within said first liquid conduit portion and said second liquid conduit portion;

a second pressure delimiting means downstream of said liquid coolant outlet, said first pressure delimiting means and said second pressure delimiting means cooperating for maintaining said coolant at an engine coolant pressure in said first liquid conduit, said coolant at said engine coolant pressure cooling said internal combustion engine and being heated at said engine coolant pressure to a temperature below a boiling point of the coolant at said engine coolant pressure such that said coolant remains in a liquid state without any part thereof vaporizing in said first liquid conduit portion and without intermixed coolant vapor;

an evaporating means connected to said coolant line system for receiving the coolant in the liquid state and for evaporating the coolant by heating the coolant to a second temperature above the boiling point and/or by expanding the coolant to below a vapor pressure of the coolant such that evaporated coolant is produced and flows in said vapor conduit portion;

a turbine connected to said evaporating means via said vapor conduit portion, said evaporating means being provided directly upstream of said turbine; and a condenser in said vapor to liquid condensation portion between said vapor conduit portion and said second liquid conduit portion.

18. A device in accordance with claim 17, wherein said internal combustion engine is a diesel engine wherein said engine coolant pressure is about 4 bar and said coolant is heated to a temperature of at least 80° C. and up to 250° C. in said internal combustion engine, said coolant comprising a fluid that remains in a liquid state in said internal combustion engine between said liquid coolant inlet and a liquid coolant outlet and evaporating at conditions of a temperature level below the temperature as a coolant in an internal combustion engine and at lower pressure than said engine coolant pressure and said coolant being able to take in all waste heat of the internal combustion engine to keep the internal combustion engine appropriately cooled during operation thereof.

19. A system m accordance with claim 18, wherein said second pressure delimiting means comprises said evaporating means in the form of an expander.

20. A system m accordance with claim 18, wherein said second pressure delimiting means comprises a pump for pumping coolant to said evaporating means.

* * * * *